(12) United States Patent
Yamazaki et al.

(10) Patent No.: US 9,274,593 B2
(45) Date of Patent: Mar. 1, 2016

(54) CHANGE THE DESTINATION PHYSICAL MACHINE INFORMATION SUCH THAT THE DESTINATION CANDIDATE OF THE CERTAIN VIRTUAL MACHINE INCLUDES AT LEAST A PHYSICAL MACHINE BELONGING TO THE SECOND PHYSICAL MACHINE GROUP

(71) Applicant: FUJITSU LIMITED, Kawasaki-shi, Kanagawa (JP)

(72) Inventors: Akito Yamazaki, Kawasaki (JP);
Naohiro Tamura, Yokohama (JP);
Sawao Iwatani, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 218 days.

(21) Appl. No.: 14/210,543

(22) Filed: Mar. 14, 2014

(65) Prior Publication Data
US 2014/0201554 A1 Jul. 17, 2014

Related U.S. Application Data

(63) Continuation of application No. PCT/JP2011/071733, filed on Sep. 22, 2011.

(51) Int. Cl.
*G06F 1/32* (2006.01)
*G06F 1/26* (2006.01)
(Continued)

(52) U.S. Cl.
CPC ............. *G06F 1/3287* (2013.01); *G06F 1/26* (2013.01); *G06F 1/3221* (2013.01);
(Continued)

(58) Field of Classification Search
CPC ....... G06F 1/26; G06F 1/3287; G06F 1/3221; G06F 9/4856; G06F 9/4893

USPC .......................................................... 703/324
See application file for complete search history.

(56) References Cited

U.S. PATENT DOCUMENTS

| 8,788,667 | B2* | 7/2014 | Saika | .................. G06F 11/0727 709/223 |
| 2011/0099403 | A1* | 4/2011 | Miyata | ...................... G06F 1/32 713/323 |

(Continued)

FOREIGN PATENT DOCUMENTS

| JP | 2007-323244 | 12/2007 |
| JP | 2011-039906 | 2/2011 |

(Continued)

OTHER PUBLICATIONS

International Search Report, mailed in connection with PCT/JP2011/071733 and mailed Nov. 1, 2011.

*Primary Examiner* — Vincent Tran
(74) *Attorney, Agent, or Firm* — Fujitsu Patent Center

(57) ABSTRACT

A management server includes a storage unit that stores therein destination physical machine information capable of identifying a physical machine serving as a destination candidate of a certain virtual machine that operates on any one of a plurality of physical machines. The management server includes a control unit that performs the following control. To stop power supply to a first physical machine group performed by a first control unit, the control unit detects. The control unit changes the destination physical machine information such that the destination candidate of the certain virtual machine includes at least a physical machine belonging to a second physical machine group when information capable of identifying the physical machine serving as the destination candidate and stored in the storage unit includes no other physical machine than a physical machine belonging to the first physical machine group.

7 Claims, 13 Drawing Sheets

(51) Int. Cl.
*G06F 9/455* (2006.01)
*G06F 9/48* (2006.01)

(52) U.S. Cl.
CPC ......... *G06F 9/45558* (2013.01); *G06F 9/4856* (2013.01); *G06F 9/4893* (2013.01); *G06F 2009/4557* (2013.01); *Y02B 60/1282* (2013.01)

(56) References Cited

U.S. PATENT DOCUMENTS

| | | |
|---|---|---|
| 2011/0131576 A1 | 6/2011 | Ikegaya et al. |
| 2011/0161483 A1 | 6/2011 | Takemura |
| 2011/0239215 A1* | 9/2011 | Sugai ................... G06F 9/45558 718/1 |
| 2012/0204051 A1 | 8/2012 | Murakami et al. |
| 2013/0339956 A1* | 12/2013 | Murase ................... G06F 9/505 718/1 |

FOREIGN PATENT DOCUMENTS

| | | |
|---|---|---|
| JP | 2011-082799 | 4/2011 |
| JP | 2011-118557 | 6/2011 |
| JP | 2011-128967 | 6/2011 |
| WO | 2010/024027 | 3/2010 |

* cited by examiner

FIG.3

| CHASSIS ID | NAME | POWER-SAVING SETTING | RETRY COUNTER | RETRY INTERVAL | REGISTRATION DATE AND TIME | POWER SOURCE STATE |
|---|---|---|---|---|---|---|
| chassisA | BX900-1 | TRUE | 10 | 3600 | 03.01.2011 7:30 | on |
| chassisB | BX900-2 | FALSE | 10 | 3600 | 03.01.2011 8:00 | off |

FIG.4

| HOST ID | NAME | CLASSIS ID | STORAGE ID | REGISTRATION DATE AND TIME | POWER SOURCE STATE |
|---|---|---|---|---|---|
| vm_hostA | vm_host-1 | chassisA | storageA | 03.03.2011 10:30 | on |
| vm_hostB | vm_host-2 | chassisB | storageA | 03.03.2011 11:00 | off |

FIG.5

| GUEST ID | NAME | HOST ID | REGISTRATION DATE AND TIME |
|---|---|---|---|
| vm_guestA | vm_guest-1 | vm_hostA | 03.04.2011 12:30 |
| vm_guestB | vm_guest-2 | vm_hostA | 03.04.2011 13:30 |
| vm_guestC | vm_guest-3 | vm_hostB | 03.04.2011 14:30 |

FIG.6

| GUEST ID | TARGET ID |
|---|---|
| vm_guestA | vm_hostA |
| vm_guestB | vm_hostB |
| vm_guestB | vm_hostC |

FIG.7

| GUEST ID | TARGET ID | MOVEMENT DATE AND TIME | STATUS |
|---|---|---|---|
| vm_guestA | vm_hostA | 03.08.2011 17:30 | TRUE |
| vm_guestB | vm_hostB | 03.01.2011 9:00 | FALSE |
| vm_guestB | vm_hostC | 03.08.2011 17:30 | TRUE |
| vm_guestB | vm_hostC | 03.10.2011 17:30 | TRUE |

FIG.8

SETTING OF CHASSIS POWER-SAVING FUNCTION    ✕

SELECTED CHASSIS            : BX900-2

CURRENT SETTING             : off

SETTING OF CHASSIS
POWER-SAVING FUNCTION  :  ⦿ on
                                                  ◯ off

[ OK ]   [ CANCEL ]

CHANGE THE DESTINATION PHYSICAL MACHINE INFORMATION SUCH THAT THE DESTINATION CANDIDATE OF THE CERTAIN VIRTUAL MACHINE INCLUDES AT LEAST A PHYSICAL MACHINE BELONGING TO THE SECOND PHYSICAL MACHINE GROUP

CROSS-REFERENCE TO RELATED APPLICATION

This application is a continuation of International Application No. PCT/JP2011/071733, filed on Sep. 22, 2011, and designating the U.S., the entire contents of which are incorporated herein by reference.

FIELD

The embodiments discussed herein are directed to a power source management device, a power source management method, and a power source management program.

BACKGROUND

Some data centers are equipped with a plurality of blade chassis (hereinafter, referred to as chassis) including devices shared by blades, such as a power source unit and a cooling fan. To reduce power consumption, such data centers integrate virtual machine (VM) guests that operate on a blade in a certain chassis into another chassis to turn off the power of the certain chassis, for example. Besides for reduction in power consumption, such data centers turn off the power of a chassis for maintenance of the chassis, for example.

To turn off the power of a chassis, first VM hosts, such as a blade server and a rack server, mounted on the chassis determine a destination of VM guests that operate on the first VM hosts from second VM hosts mounted on another chassis. The first VM hosts then move the VM guests to the destination thus determined. After moving all the VM guests that operate on the first VM hosts to any of the second VM hosts, the first VM hosts turn off the power thereof. Subsequently, the chassis checks that the power of all the VM hosts mounted on the chassis is turned off with management software, for example. The chassis then turns off the power thereof. Some conventional examples are described in Japanese Laid-open Patent Publication No. 2011-039906 and Japanese Laid-open Patent Publication No. 2007-323244.

The conventional technologies, however, may possibly fail to turn off the power of the chassis, thereby failing to reduce power consumption. This problem is not limited to the chassis. Also when turning off the power of physical servers, such as a rack server and a tower server, in which the VM hosts operate to reduce power consumption, the conventional technologies may possibly fail to turn off the power of the physical servers, thereby failing to reduce power consumption.

A VM host in such a data center, for example, is assigned VM hosts serving as destination candidates to which VM guests of the VM host can be moved by an administrator or the like. To move the VM guests, the VM host moves the VM guests to a VM host mounted on a chassis whose power is on among the destination candidates, for example. The VM host then turns off the power thereof.

If there is no other destination of a VM guest that operates on another VM host than the VM host whose power is turned off, the VM host may possibly be specified as the destination. As a result, the chassis fails to turn off the power thereof.

SUMMARY

According to an aspect of the embodiment, a power source management device includes a plurality of physical machines; a first control unit that performs power supply control on a first physical machine group including at least one physical machine among the physical machines; a second control unit that performs power control on a second physical machine group including at least one physical machine among the physical machines and performs power control on a physical machine different from one on which the first control unit performs power supply control; a storage unit that stores therein destination physical machine information capable of identifying a physical machine serving as a destination candidate of a certain virtual machine that operates on any one of the physical machines; and a control unit that changes, to stop power supply to the first physical machine, the destination physical machine information being stored in the storage unit into the destination physical machine information that includes, into the destination candidate of the certain virtual machine, at least a physical machine belonging to the second physical machine group when information capable of identifying the physical machine serving as the destination candidate and stored in the storage unit includes no other physical machine than a physical machine belonging to the first physical machine group.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is an example diagram of information stored in a chassis management DB;

FIG. 4 is an example diagram of information stored in a VM host management DB;

FIG. 5 is an example diagram of information stored in a VM guest management DB;

FIG. 6 is an example diagram of information stored in a link management DB;

FIG. 7 is an example diagram of information stored in a result management DB;

FIG. 8 is an example schematic of a dialog;

DESCRIPTION OF EMBODIMENTS

Preferred embodiments will be explained with reference to accompanying drawings. The embodiments are not intended to limit the invention.

[a] First Embodiment

Entire Configuration

Figure 1:
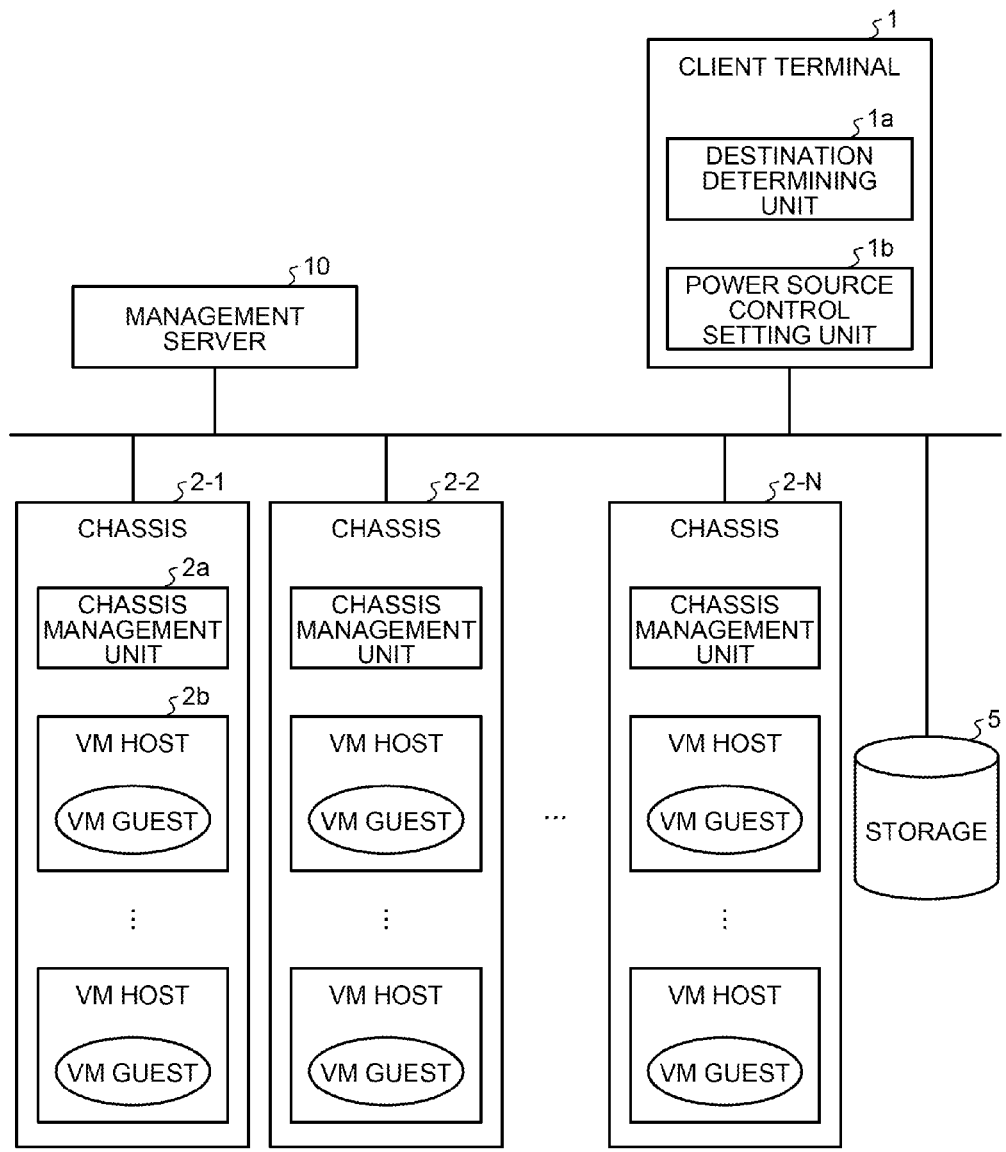
FIG. 1 is an example diagram of an entire configuration of a system according to a first embodiment.

FIG. 1 is an example diagram of an entire configuration of a system according to a first embodiment. As illustrated in FIG. 1, the system is formed of a client terminal 1, a chassis 2-1 to a chassis 2-N (N is a natural number), a storage 5, and a management server 10 connected to one another via a network. Each device recognizes communication information, such as an Internet Protocol (IP) address, of the other devices. The number of devices is given just as an example. The number of devices is not limited thereto and may be changed arbitrarily.

Application examples of the system include a system that provides services to a client via a cloud system or the like. FIG. 1 illustrates an example of a data center equipped with servers or the like that form a cloud system. VM guests that operate on respective VM hosts mounted on a chassis perform various types of processing, thereby providing services to a client.

The client terminal 1 illustrated in FIG. 1 is a computer used by an administrator or the like of the system. The client terminal 1 has a configuration similar to that of a typical computer. The client terminal 1 includes a destination determining unit 1a and a power source control setting unit 1b as processing units provided by a processor, for example.

The destination determining unit 1a is a processing unit that specifies a VM host serving as a destination for each VM guest that operates in the system. The destination determining unit 1a stores destination candidates of respective VM guests received from the administrator or the like in the management server 10. The power source control setting unit 1b is a processing unit that sets whether to carry out a power-saving measure for each chassis. The power source control setting unit 1b receives information of a chassis whose power is to be turned off from the administrator and notifies the management server 10 of the information, for example.

Each chassis is a device on which a VM host that operates a VM guest is mounted and includes a processing unit similar to that of a typical chassis. Each chassis can also perform power supply control on a physical machine group including at least one physical machine among a plurality of physical machines. Because the chassis illustrated in FIG. 1 have the same configuration, the chassis 2-1 will be described. The numbers of VM hosts mounted on the respective chassis need not be the same. The chassis 2-1 includes a chassis management unit 2a and a plurality of VM hosts. The number of VM hosts can be set arbitrarily.

The chassis management unit 2a is a processing unit that controls the entire chassis 2-1 and performs power source control on the chassis, for example. When receiving an instruction to turn off the power from the management server 10, for example, the chassis management unit 2a turns off the power of the chassis 2-1.

A VM host 2b is a physical machine, such as a blade server and a rack server. The VM host 2b provides a virtual space and causes at least one VM guest to operate. When receiving a movement instruction of the VM guest from the management server 10, the VM host 2b moves the VM guest to a specified destination. The VM guest is moved by a method similar to typical live migration. The method is briefly described as follows: the VM host 2b moves a disk image including a processor, a memory, and network information used by the VM guest to be moved to the destination, for example.

The storage 5 is a storage device, such as a hard disk, and is connected to each VM host and each VM guest via a storage area network (SAN), a network attached storage (NAS), or the like. The storage 5 stores therein data used by each VM guest, for example.

The management server 10 is a server that manages movement of the VM guests, for example. The management server 10 integrates the VM guests executed in a chassis to turn off the power of the chassis as a power-saving measure. The management server 10 stores therein destination physical machine information capable of identifying a VM host serving as a destination candidate of a VM guest executed on any one of a plurality of VM hosts. To stop power supply to a first physical machine group of a first chassis, the management server 10 detects whether the information capable of identifying a VM host serving as a destination candidate thus stored includes no other VM host than the VM hosts belonging to the first physical machine group. The management server 10 changes the destination physical machine information such that destination candidates of a VM guest include a VM host belonging to at least a second physical machine group.

As described above, if a first VM host that moves a VM guest on itself serves as the only destination of a VM guest that operates on another VM host, the management server 10 can add a second VM host as another destination. To turn off the power of the first VM host that moves the VM guest or to turn off the power of a chassis on which the first VM host is mounted, the management server 10 can prevent the first VM host from serving as the only destination of another VM guest. As a result, the management server 10 can turn off the power of VM hosts and chassis in power source management units, thereby reducing power consumption.

Configuration of the Device

Figure 2:
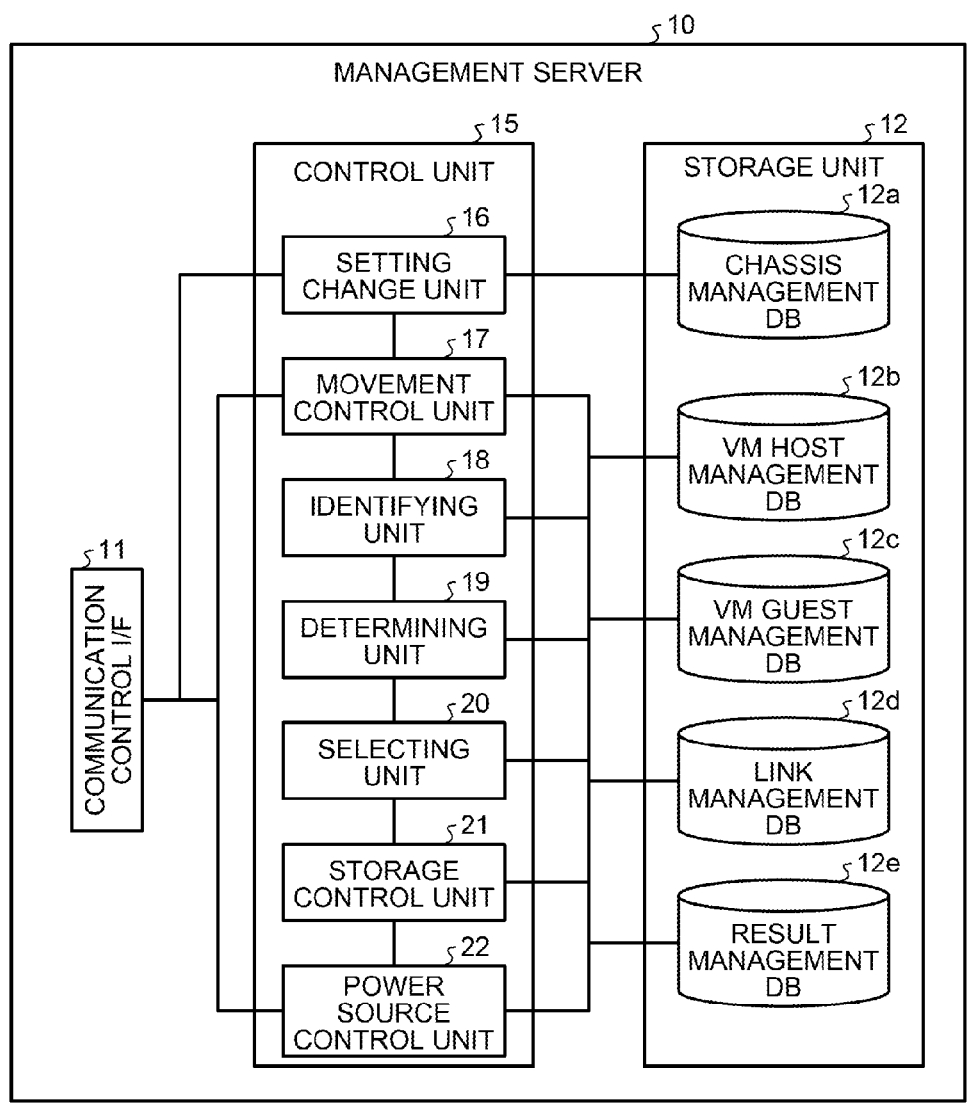
FIG. 2 is a functional block diagram of a configuration of a management server.

The following describes a configuration of the management server 10 illustrated in FIG. 1. FIG. 2 is a functional block diagram of a configuration of the management server. As illustrated in FIG. 2, the management server 10 includes a communication control interface (I/F) 11, a storage unit 12, and a control unit 15. The processing units described herein are given just as an example, and the embodiment is not limited thereto. The management server 10 may include an input unit, such as a mouse, a display unit, such as a display, and a storage medium reading unit that reads data from a storage medium, for example.

The communication control I/F 11 is a network interface card that controls communications performed with other devices. The communication control I/F 11, for example, receives destination information for specifying a destination of each VM guest and a power source control instruction indicating whether to start power source control of a VM host or a chassis from the client terminal 1. The communication control I/F 11 transmits a movement instruction of a VM guest to a VM host and receives a movement result of the VM guest.

The storage unit 12 is a storage device, such as a semiconductor memory device and a hard disk. The storage unit 12 includes a chassis management database (DB) 12a, a VM host management DB 12*b*, a VM guest management DB 12*c*, a link management DB 12*d*, and a result management DB 12*e*. The storage unit 12 further includes a work area in which data is temporarily stored when processing units included in the control unit 15 perform processing, for example.

The chassis management DB 12*a* stores therein information relating to each chassis in the system. FIG. 3 is an example diagram of information stored in the chassis management DB. As illustrated in FIG. 3, the chassis management DB 12*a* stores therein "a chassis ID, a name, power-saving setting, a retry counter, a retry interval, registration date and time, and a power source state" in a manner associated with one another.

The "chassis ID" thus stored represents an identifier that identifies a chassis. The "name" represents a name assigned to the chassis. The "power-saving setting" represents whether setting of execution of a power-saving measure is made for the chassis. If the setting is made, "TRUE" is set; whereas if the setting is not made or by default, "FALSE" is set. The "retry counter" represents the upper limit of an allowable number of times of retry. The "retry interval" represents the number of seconds taken until retry is started. The "registration date and time" represents date and time when the chassis is registered as a management target of the management server 10 by the administrator or the like. The "power source state" represents the power source state of the chassis. If the power is on, "on" is stored; whereas if the power is cut off, "off" is stored. The pieces of information thus stored are initially registered by the administrator and are updated by the administrator or the processing units of the control unit 15.

FIG. 3 indicates that a name "BX900-1" is assigned to a chassis having a chassis ID "chassisA" and that the chassis is registered in the management server 10 at "2011/3/1 7:30". In terms of the "BX900-1", it is indicated that the power-saving setting is enabled, "10" is set as the upper limit of the number of times of retry, "3600 seconds" is set as the retry interval, and the power is "on".

The VM host management DB 12*b* stores therein information relating to a VM host that operates in the system. FIG. 4 is an example diagram of information stored in the VM host management DB. As illustrated in FIG. 4, the VM host management DB 12*b* stores therein "a host ID, a name, a chassis ID, a storage ID, registration date and time, and a power source state" in a manner associated with one another.

The "host ID" thus stored represents an identifier that identifies a VM host. The "name" represents a name, such as a host name, assigned to the VM host. The "chassis ID" represents an identifier of a chassis on which the VM host is mounted. The "storage ID" represents an identifier that identifies a storage connected to the VM host, that is, an identifier of a storage that stores therein data of the VM host. The "registration date and time" represents date and time when the VM host is registered as a management target of the management server 10 by the administrator or the like. The "power source state" represents the power source state of a chassis. If the power is on, on is stored; whereas if the power is cut off, "off" is stored. The pieces of information thus stored are initially registered by the administrator and are updated by the administrator or the processing units of the control unit 15.

FIG. 4 indicates that a host ID "vm_hostA" is assigned to a VM host having a host name "vm_host-1" and that the VM host is registered in the management server 10 at "2011/3/3 10:30". It is also indicated that the "vm_host-1" is mounted on the chassis having the chassis ID "chassisA" and is connected to a storage having a storage ID "storageA" and that the power is "on".

The VM guest management DB 12*c* stores therein information relating to a VM guest that operates in the system. FIG. 5 is an example diagram of information stored in the VM guest management DB. As illustrated in FIG. 5, the VM guest management DB 12*c* stores therein "a guest ID, a name, a host ID, and registration date and time" in a manner associated with one another. The "guest ID" thus stored represents an identifier that identifies a VM guest. The "name" represents a name assigned to the VM guest. The "host ID" represents an identifier of a VM host on which the VM guest operates. The "registration date and time" represents date and time when the VM guest is registered as a management target of the management server 10 by the administrator or the like. The pieces of information thus stored are initially registered by the administrator and are updated by the administrator or the processing units of the control unit 15.

FIG. 5 indicates that a guest ID "vm_guestA" is assigned to a VM guest having a name "vm_guest-1" and that the VM guest is registered in the management server 10 at "2011/3/4 12:30". It is also indicated that the "vm_guestA" operates on the VM host having the host ID "vm_hostA". In terms of a VM host whose power is off, "nil" is stored.

The link management DB 12*d* stores therein information for identifying a VM host serving as a destination candidate for each VM guest. FIG. 6 is an example diagram of information stored in the link management DB. As illustrated in FIG. 6, the link management DB 12*d* stores therein "a guest ID and a target ID" in a manner associated with each other. The "guest ID" thus stored represents an identifier that identifies a VM guest. The "target ID" represents an identifier of a VM host specified as a destination of the VM guest. In terms of the pieces of information thus stored, a VM host to which the VM guest can be moved is registered by the administrator in initial registration and is updated by the administrator or the processing units of the control unit 15. In the initial registration, the administrator specifies a VM host mounted on a chassis different from the chassis on which the VM guest operates as the destination candidate of the VM guest.

FIG. 6 indicates that a VM host having a target ID "vm_hostA" is specified as a destination candidate of the VM guest having the guest ID "vm_guestA". Similarly, it is indicated that a VM host having a target ID "vm_hostB" and a VM host having a target ID "vm_hostC" are specified as destination candidates of a VM guest having a guest ID "vm_guestB".

The result management DB 12*e* stores therein a result of movement of a VM guest to a VM host. FIG. 7 is an example diagram of information stored in the result management DB. As illustrated in FIG. 7, the result management DB 12*e* stores therein "a guest ID, a target ID, movement date and time, and a status" in a manner associated with one another. The "guest ID" thus stored represents an identifier of a VM guest. The "target ID" represents an identifier of a VM host to which the VM guest is moved. The "movement date and time" represents date and time when the VM guest is moved. The "status" represents a success or a failure of movement. The pieces of information thus stored are updated by the processing units of the control unit 15.

FIG. 7 indicates that movement of the VM guest having the guest ID "vm_guestA" to the "vm_hostA" "succeeded" at "2011/3/8 17:30". Similarly, it is indicated that movement of the VM guest having the guest ID "vm_guestB" to the "vm_hostC" "succeeded" at "2011/3/8 17:30" and "2011/3/10 17:30". It is also indicated that movement of the VM guest having the guest ID "vm_guestB" to the "vm_hostB" "failed" at "2011/3/1 9:00".

The control unit 15 is an electronic circuit, such as a processor, that operates an operating system (OS) and is a processing unit that controls the entire processing of the management server 10. The control unit 15 includes a setting change unit 16, a movement control unit 17, an identifying unit 18, a determining unit 19, a selecting unit 20, a storage control unit 21, and a power source control unit 22.

The setting change unit 16 is a processing unit that receives setting of whether to enable or disable a power-saving function of a chassis from the client terminal 1. When receiving Web access from the client terminal 1, for example, the setting change unit 16 transmits a dialog to the client terminal 1. The setting change unit 16 then reflects the contents received on the dialog to the chassis management DB 12a.

FIG. 8 is an example schematic of a dialog. As illustrated in FIG. 8, the dialog transmitted to the client terminal 1 by the setting change unit 16 has "selected chassis", "current setting", and "setting of chassis power-saving function" as setting contents selected by a user. In the "selected chassis", the user can select a chassis ID or a chassis name with a pull-down menu or the like, thereby selecting a chassis on which a power-saving measure is carried out. The "current setting" indicates the contents of "power-saving setting" stored in the chassis management DB 12a in a manner associated with the chassis thus selected. If the "power-saving setting" is "TRUE", "on" is displayed; whereas if "power-saving setting" is "FALSE", "off" is set. The "setting of chassis power-saving function" receives a change of the chassis power-saving setting. If "on" is selected, the "power-saving setting" in the chassis management DB 12a is set to "TRUE"; whereas if "off" is selected, the "power-saving setting" is set to "FALSE". The dialog of FIG. 8 indicates an example in which setting of a chassis "BX900-2" whose current setting is "off" is changed to "on".

The movement control unit 17 is a processing unit that moves a VM guest. To turn off the power of a chassis whose power-saving setting is on for achievement of power-saving, the movement control unit 17 moves a VM guest that operates on a VM host mounted on the chassis to another VM host mounted on another chassis, for example. The movement control unit 17 then outputs the host ID of the VM host in which movement of the VM guest is completed to the power source control unit 22.

More specifically, if the user instructs to carry out a power-saving measure, the movement control unit 17 refers to the chassis management DB 12a, thereby identifying the "chassis ID" or the "name" of a chassis whose "power-saving setting" is set to "TRUE". Subsequently, the movement control unit 17 refers to the VM host management DB 12b, thereby identifying a "host ID" associated with the "chassis ID" thus identified. If the user instructs to carry out a power-saving measure, the movement control unit 17 refers to the VM guest management DB 12c, thereby identifying a "guest ID" associated with the "host ID" thus identified. As a result, the movement control unit 17 can identify a pair of the "host ID" of the VM host mounted on the chassis whose power is desired to be turned off and the "guest ID" of the VM guest that operates on the VM host.

Subsequently, the movement control unit 17 refers to the link management DB 12d, thereby extracting a host ID other than the "host ID" identified in the same manner as described above among the "host IDs" associated with the "guest ID" thus identified. An assumption is made that the VM host mounted on the chassis whose power is desired to be turned off is "vm_hostB" and that the VM guest that operates on the VM host is "vm_guestB", for example. In this case, the movement control unit 17 specifies a host ID other than the "vm_hostB" as a destination of the "vm_guestB" to be moved based on the link management DB 12d. In the case of FIG. 6, the movement control unit 17 specifies the "vm_hostC" as the destination of the "vm_guestB".

The movement control unit 17 then transmits, to the VM host serving as the source of the VM guest whose destination is specified, information of the VM host serving as the destination and an instruction to move the VM guest. Subsequently, the movement control unit 17 receives a movement result from the VM host serving as the destination and stores the movement result in the result management DB 12e. In the example described above, the movement control unit 17 transmits, to the "vm_hostB" serving as the source, an instruction to move the "vm_guestB" to the "vm_hostC". The movement control unit 17 receives a movement result from the "vm_hostC" serving as the destination. The movement control unit 17 then stores the movement date and time and the status in the result management DB 12e in a manner associated with the guest ID "vm_guestB" and the target ID "vm_hostC".

After moving the VM guest, the movement control unit 17 generates a new record or updates an existing record in the VM guest management DB 12c, for example. Thus, the movement control unit 17 maintains the latest information indicating which VM host the VM guest is moved to. If the "vm_guestB" is moved from the "vm_hostB" to the "vm_hostC", for example, the movement control unit 17 updates the "host ID" of the record corresponding to the pair of the "vm_guestB" and the "vm_hostB" in the VM guest management DB 12c, that is, updates the "vm_hostB" with "nil". The movement control unit 17 generates a record corresponding to the pair of the "vm_guestB" and the "vm_hostC" in the VM guest management DB 12c.

Referring back to FIG. 2, the identifying unit 18 is a processing unit that identifies a guest ID stored in the link management DB 12d in a manner associated with a host ID that identifies a certain VM host from which a VM guest is moved to another VM host. Specifically, the identifying unit 18 refers to the link management DB 12d, thereby identifying a guest ID associated with a host ID of a VM host whose power is turned off by the power source control unit 22. The identifying unit 18 then outputs the guest ID thus identified to the determining unit 19.

In an example, the identifying unit 18 refers to the link management DB 12d, thereby identifying the "vm_guestB" associated with the "vm_hostA" whose power is turned off. The identifying unit 18 then outputs the "vm_guestB" to the determining unit 19. In another example, the identifying unit 18 refers to the link management DB 12d, thereby identifying the "vm_guestA" associated with the "vm_hostA" whose power is turned off. The identifying unit 18 then outputs the "vm_guestA" to the determining unit 19.

The determining unit 19 is a processing unit that determines whether there is no other host ID stored in the link management DB 12d in a manner associated with the guest ID identified by the identifying unit 18 than a host ID of a VM host whose power is turned off. In the example described above, the determining unit 19 refers to the link management DB 12d, thereby determining whether any host ID associated with the "vm_guestB" identified by the identifying unit 18 is currently present other than the "vm_hostB" that operates the "vm_guestB".

If a host ID associated with the "vm_guestB" is present other than the "vm_hostB", the determining unit 19 deletes the record corresponding to the "vm_guestB" from the link management DB 12d. By contrast, if no other host ID associated with the "vm_guestB" is present than the "vm_hostB", the determining unit 19 notifies the selecting unit 20 of the "vm_guestB" serving as a guest ID.

The selecting unit 20 is a processing unit that selects an identifier of a second VM host other than the first VM host as another destination if the determining unit 19 determines that there is no other host ID than a host ID of a first VM host whose power is turned off. Specifically, the selecting unit 20 selects the second VM host as a new destination candidate based on any one of or an arbitrary combination of the following "selection criteria" for a VM guest having only the first VM host whose power is turned off as the destination candidate. The selecting unit 20 then outputs the second VM host to the storage control unit 21.

First Selection Criterion

The selecting unit 20 selects a VM machine to which the VM guest is successfully moved previously as a new destination candidate. Specifically, the selecting unit 20 refers to the result management DB 12e, thereby selecting a VM host other than the VM host serving as the source among the VM hosts to which the VM guest serving as the target is successfully moved previously as a new destination candidate. An assumption is made that there is no other destination candidate of the "vm_guestB" than the "vm_hostA" whose power is turned off, for example. The selecting unit 20 refers to the result management DB 12e, thereby identifying a record other than the "vm_hostA" among the "target IDs" whose guest ID is the "vm_guestB" and whose "status" is "TRUE". The selecting unit 20 then outputs the "target ID" of the record thus identified to the storage control unit 21 as a new destination candidate of the "vm_guestB".

Second Selection Criterion

The selecting unit 20 selects a VM machine to which the VM guest is most frequently successfully moved previously as a new destination candidate. Specifically, the selecting unit 20 refers to the result management DB 12e, thereby selecting a VM host having the largest number of times of movement and other than the VM host serving as the source among the VM hosts to which the VM guest is successfully moved previously as a new destination candidate. The following describes the second selection criterion using an example similar to that for the first selection criterion. The selecting unit 20 refers to the result management DB 12e, thereby extracting records whose "status" is "TRUE". At this time, the selecting unit 20 may make the selection only from records of the "vm_guestB". Subsequently, the selecting unit 20 counts the number of "target IDs" from the records thus extracted. Thus, the selecting unit 20 selects a "target ID" whose counting result is the largest among the "target IDs" other than the "vm_hostA" serving as the source as a new destination candidate. The selecting unit 20 then outputs the "target ID" thus selected to the storage control unit 21 as a new destination candidate of the "vm_guestB".

Third Selection Criterion

The selecting unit 20 selects a VM machine having the latest movement date and time as a new destination candidate. Specifically, the selecting unit 20 refers to the result management DB 12e, thereby selecting a VM host to which the VM guest is most recently moved among VM hosts other than the VM host serving as the source as a new destination candidate. The following describes the third selection criterion using an example similar to that for the first selection criterion. The selecting unit 20 refers to the result management DB 12e, thereby identifying a record whose "movement date and time" is the latest other than the record storing therein the "vm_hostA" serving as the source as the "target ID". At this time, the selecting unit 20 may make the selection only from at least one of records of the "vm_guestB" and records whose "status" is "TRUE". Subsequently, the selecting unit 20 selects a "target ID" of the record thus identified as a new destination candidate. The selecting unit 20 then outputs the "target ID" thus selected to the storage control unit 21.

Fourth Selection Criterion

The selecting unit 20 selects a VM machine having the latest registration date and time to the management server 10 as a new destination candidate. Specifically, the selecting unit 20 refers to the result management DB 12e and the VM host management DB 12b. The selecting unit 20 selects a VM host whose "registration date and time" is the latest among VM hosts other than the VM host serving as the source as a new destination candidate. The following describes the fourth selection criterion using an example similar to that for the first selection criterion. The selecting unit 20 extracts "target IDs" other than the "vm_hostA" serving as the source among "target IDs" registered in the result management DB 12e. At this time, the selecting unit 20 may make the selection only from at least one of records of the "vm_guestB" and records whose "status" is "TRUE". Subsequently, the selecting unit 20 extracts the "registration date and time" corresponding to the "target IDs" thus extracted, that is, to the "host IDs" from the VM host management DB 12b. The selecting unit 20 then outputs a "host ID" whose "registration date and time" thus extracted is the latest to the storage control unit 21 as a new destination candidate of the "vm_guestB".

Referring back to FIG. 2, the storage control unit 21 is a processing unit that stores a VM host selected by the selecting unit 20 in the link management DB 12d as a new destination candidate of a VM guest to be moved. The storage control unit 21, for example, receives the fact that "vm_hostD" is selected as a new destination candidate of the "vm_guestB" having no other destination candidate than the "vm_hostA" from the selecting unit 20. The storage control unit 21 then stores the "vm_guestB" and the "vm_hostD" in the link management DB 12d in a manner associated with each other. As a result, a new destination candidate of the "vm_guestB" is registered.

The power source control unit 22 is a processing unit that instructs a chassis or a VM host to turn on or off the power. When receiving a host ID of a VM host in which movement of a VM guest is completed from the movement control unit 17, for example, the power source control unit 22 transmits an instruction to turn off the power to the VM host. After the power of the VM host is turned off, the power source control unit 22 updates the "power source state" stored in the VM host management DB 12b in a manner associated with the "host ID" of the VM host with "off".

If the processing units described above keep all the VM hosts in a chassis whose power is to be turned off from serving as the only destination of a VM guest that operates on another chassis, the power source control unit 22 transmits an instruction to turn off the power to the chassis whose power is to be turned off. After the power of the chassis is turned off, the power source control unit 22 updates the "power source state" stored in the chassis management DB 12a in a manner associated with the "chassis ID" of the chassis with "off".

Flow of Processing

The following describes processing for reducing power consumption by the management server turning off the power of a chassis with reference to FIG. 9 to FIG. 15.

Entire Flow

Figure 9:
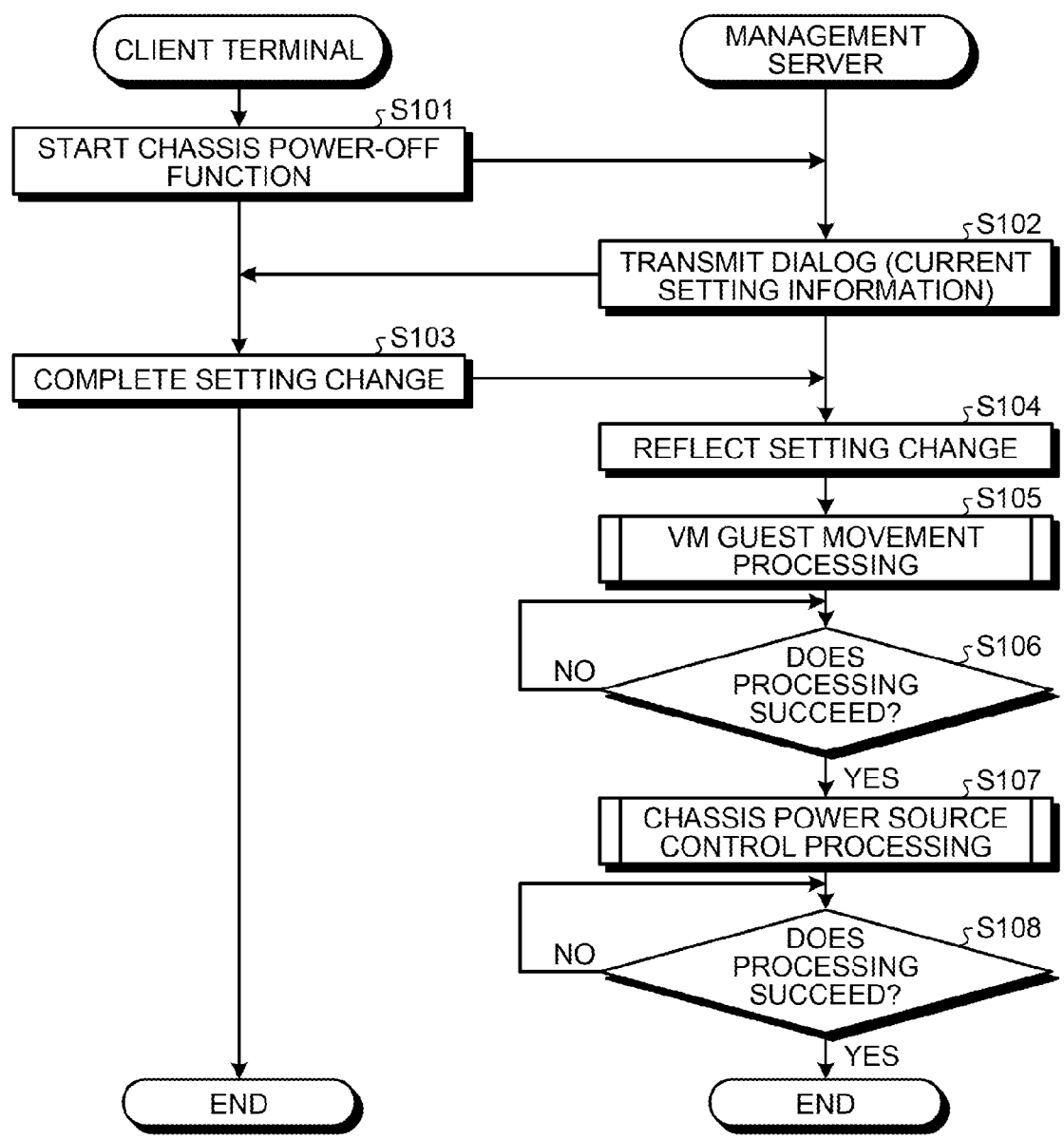
FIG. 9 is a sequence diagram of a flow of processing performed by the system according to the first embodiment.

FIG. 9 is a sequence diagram of a flow of processing performed by the system according to the first embodiment. As illustrated in FIG. 9, if the client terminal 1 receives an instruction to start a power-off function of a chassis from the user, the client terminal 1 starts Web access to the management server 10 (S101).

The setting change unit 16 of the management server 10 transmits a dialog to the client terminal 1 in response to the Web access received from the client terminal 1 (S102). The power source control setting unit 1b of the client terminal 1 changes power-saving setting of each chassis on the dialog received from the management server 10 in accordance with an instruction operation performed by the user (S103).

The setting change unit 16 of the management server 10 reflects the change in the power-saving setting of a chassis made on the dialog on the chassis management DB 12a (S104). The movement control unit 17 of the management server 10 performs VM guest movement processing for moving a VM guest that operates on the chassis serving as a power-saving target to another chassis (S105).

After the VM guest movement processing is normally finished (Yes at S106), the management server 10 performs chassis power source control processing for turning off the power of the chassis serving as the power-saving target (S107). After the chassis power source control processing is normally finished (Yes at S108), the management server 10 terminates the processing. While the VM guest movement processing and the chassis power source control processing are performed after the power-saving setting of the chassis is changed, the timings of these processing are not limited thereto. These processing may be performed at timings different from that of each processing.

VM Guest Movement Processing

Figure 10:
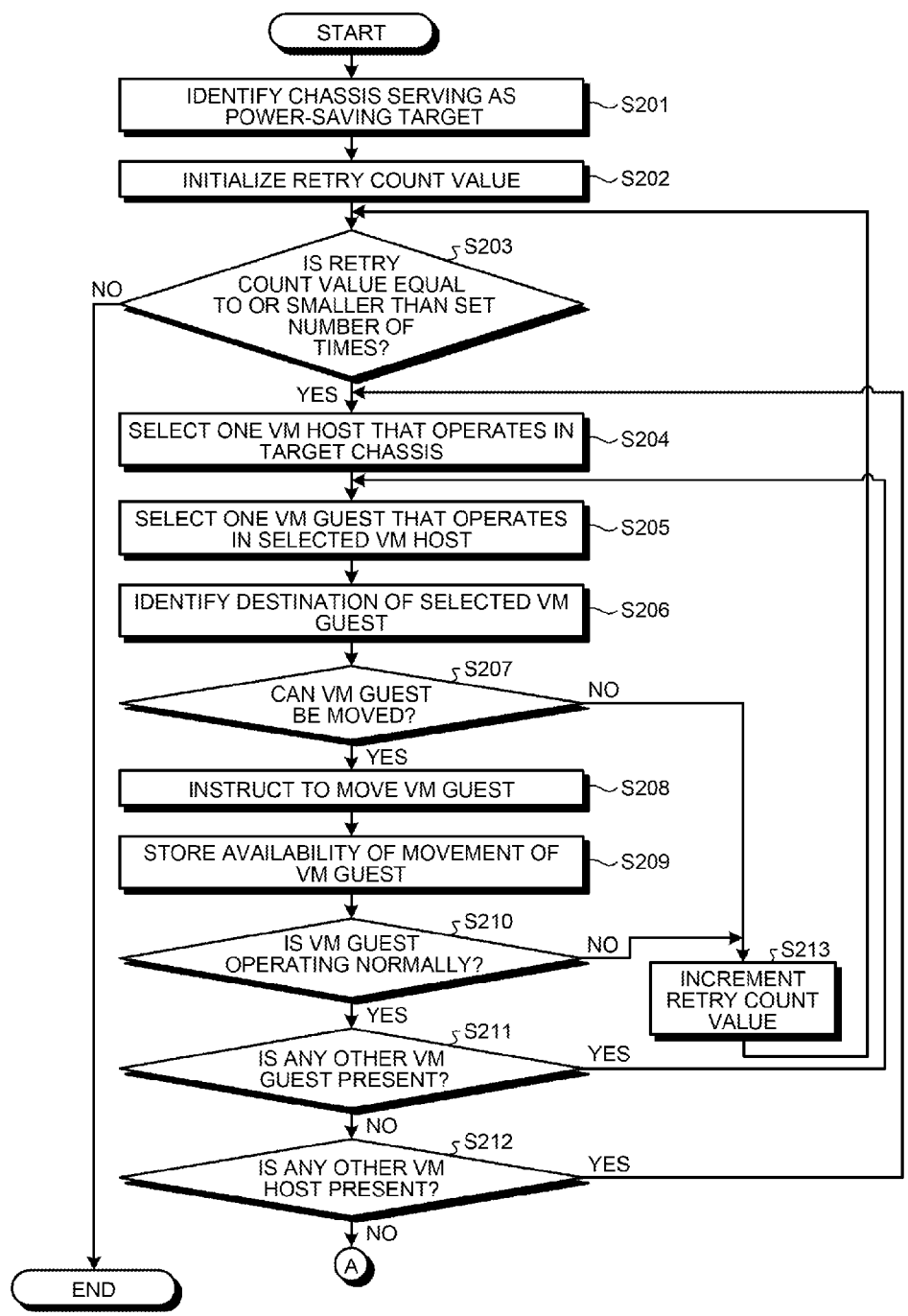
FIG. 10 is a flowchart for explaining a flow of VM guest movement processing.
Figure 11:
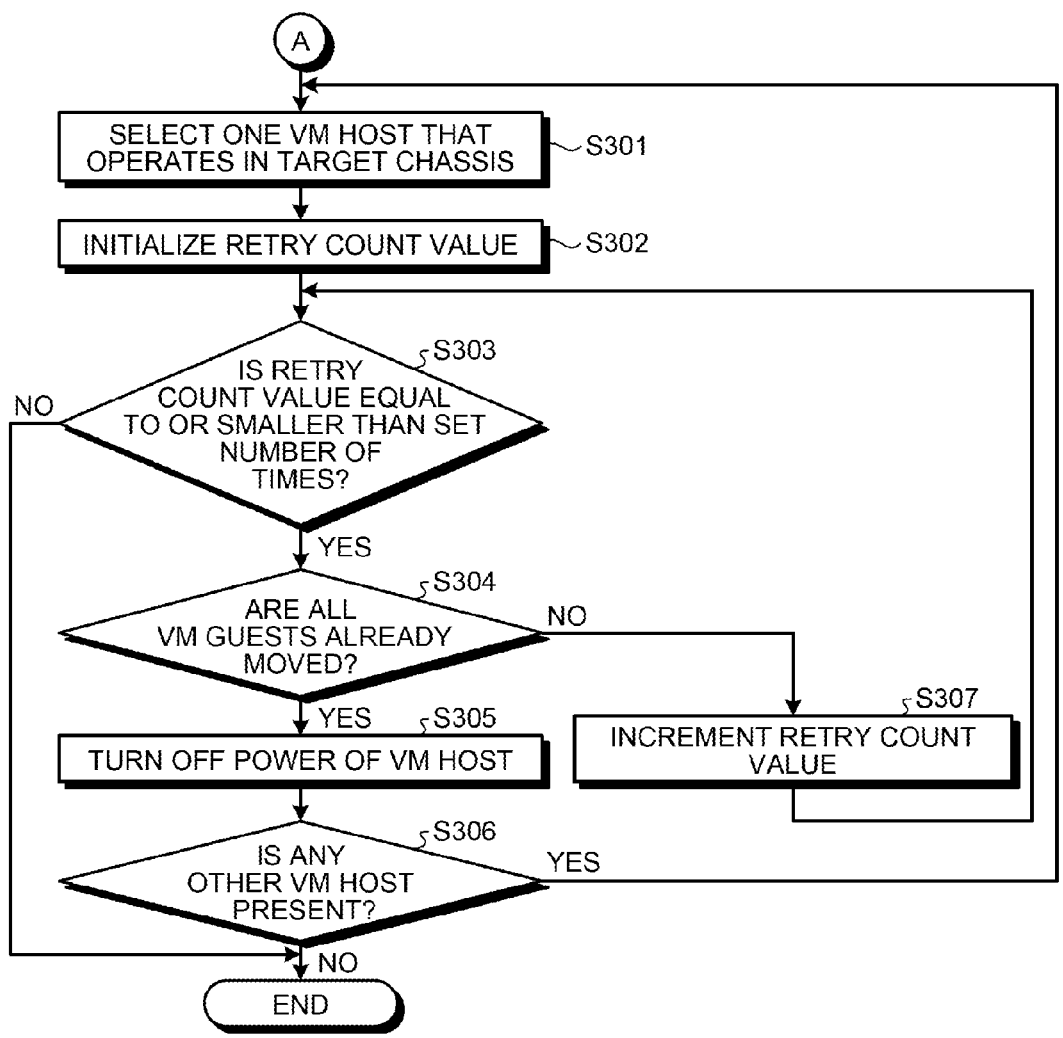
FIG. 11 is a flowchart for explaining a flow of VM guest movement processing.

The following describes the VM guest movement processing performed at S105 in FIG. 9. FIG. 10 and FIG. 11 are a flowchart for explaining a flow of the VM guest movement processing. The processing of the flowchart is performed on each chassis on which the power-saving measure is carried out.

As illustrated in FIG. 10, the movement control unit 17 of the management server 10 identifies a "chassis ID" whose "power-saving setting" is "TRUE" in the chassis management DB 12a (S201). The movement control unit 17 initializes a retry count value obtained by counting the number of times of retry (S202).

The movement control unit 17 extracts a "retry counter" associated with the "chassis ID" identified at S201 from the chassis management DB 12a. The movement control unit 17 then determines whether the current retry count value is equal to or smaller than a set number of times set in the retry counter (S203). Because the retry count value is set to 0 at initial start-up, the movement control unit 17 determines that the current retry count value is equal to or smaller than the set number of times.

If the retry count value is equal to or smaller than the set number of times (Yes at S203), the movement control unit 17 selects one "host ID" stored in a manner associated with the "chassis ID" identified at S201 from the VM host management DB 12b (S204). If the retry count value is larger than the set number of times (No at S203), the movement control unit 17 terminates the processing.

The movement control unit 17 selects one "guest ID" stored in a manner associated with the "host ID" selected at S204 from the VM guest management DB 12c (S205). The movement control unit 17 identifies a "target ID" associated with the "guest ID" thus selected in the link management DB 12d (S206). In other words, the movement control unit 17 extracts a destination candidate of the VM guest that operates on the VM host mounted on the chassis serving as the power-saving target.

The movement control unit 17 determines whether the VM guest corresponding to the "guest ID" thus selected can be moved to the VM host corresponding to the "target ID" thus identified (S207). If central processing unit (CPU) load of the VM host serving as the destination is equal to or smaller than a threshold, for example, the movement control unit 17 determines that the VM guest can be moved. Alternatively, the movement control unit 17 determines memory capacity or the like used by the VM guest to be moved from the VM host serving as the source. If the memory capacity is secured in the VM host serving as the destination, the movement control unit 17 determines that the VM guest can be moved.

If it is determined that the VM guest to be moved can be moved (Yes at S207), the movement control unit 17 instructs the VM host serving as the source to move the VM guest (S208). The movement control unit 17 transmits, to the VM host corresponding to the "host ID" of the source selected at S204, an instruction to move the VM guest corresponding to the "guest ID" selected at S205 to the VM host corresponding to the "target ID" identified at S206, for example.

The movement control unit 17 receives availability of movement of the VM guest from the VM host serving as the destination and stores the availability of movement in the result management DB 12e (S209). The movement control unit 17 acquires whether the VM guest thus moved is operating normally from the VM host serving as the destination (S210).

If the VM guest thus moved is operating normally (Yes at S210), the movement control unit 17 determines whether any other VM guest that operates on the VM host specified at S204 is present using a method similar to that of S205 (S211). If the movement succeeds, the movement control unit 17 updates the "host ID" associated with the guest ID to be moved with "nil" in the VM guest management DB 12c. In addition, the movement control unit 17 generates a new record in which the guest ID to be moved and the host ID serving as the destination are associated with each other.

If no other VM guest that operates on the VM host serving as the target is present (No at S211), the movement control unit 17 determines whether any other VM host mounted on the chassis identified at S201 is present using a method similar to that of S204 (S212). The movement control unit 17 stores the host ID for which the processing is finished in the work area, for example. The movement control unit 17 then determines whether a host ID yet to be stored in the work area is present among the host IDs associated with the chassis serving as the power-saving target in the VM host management DB 12b.

If the movement control unit 17 determines that no other VM host mounted on the chassis serving as the power-saving target is present (No at S212), the management server 10 performs processing of the flowchart in FIG. 11.

By contrast, If any other VM host mounted on the chassis serving as the power-saving target is present (Yes at S212), the system control is returned to S204. The movement control unit 17 selects another VM host and then repeats the processing subsequent thereto.

If it is determined that any other VM guest that operates on the VM host serving as the target is present at S211 (Yes at S211), the system control is returned to S205. The movement control unit 17 selects another VM guest and then repeats the processing subsequent thereto.

If it is determined that the VM guest to be moved fails to be moved at S207 (No at S207), the movement control unit 17 increments the retry count value (S213). Subsequently, the system control is returned to S203, and the movement control unit 17 retries the processing. At this time, the movement control unit 17 may perform the processing at and after S203 on another VM host or on the same VM host.

Similarly, if it is determined that the VM guest thus moved is not operating normally at S210 (No at S210), the movement control unit 17 increments the retry count value (S213). Subsequently, the system control is returned to S203, and the movement control unit 17 retries the processing. At this time, the movement control unit 17 may perform the processing at and after S203 on another VM host or on the same VM host. If the VM guest performs processing using a processor in the destination or if the VM guest accesses a storage or the like, the movement control unit 17 determines that the VM guest is operating normally.

As illustrated in FIG. 11, the movement control unit 17 selects one VM host mounted on the chassis serving as the power-saving target, that is, the chassis identified at S201 (S301). Specifically, the movement control unit 17 selects one "host ID" stored in a manner associated with the "chassis ID" identified at S201 from the VM host management DB 12b.

The movement control unit 17 initializes the retry count value obtained by counting the number of times of retry (S302). The movement control unit 17 extracts a "retry counter" stored in a manner associated with the "host ID" specified at S301 from the VM host management DB 12b. The movement control unit 17 determines whether the current retry count value is equal to or smaller than a set number of times set in the retry counter (S303).

If the retry count value is equal to or smaller than the set number of times (Yes at S303), the movement control unit 17 determines whether all the VM guests that operate on the VM host specified at S301 are moved to another VM host (S304). If the "host ID" selected at S301 is not registered in the VM guest management DB 12c, for example, the movement control unit 17 determines that all the VM guests are already moved.

If the movement control unit 17 determines that all the VM guests are already moved (Yes at S304), the power source control unit 22 transmits an instruction to turn off the power to the VM host corresponding to the "host ID" specified at S301 (S305). The VM host receives the instruction and turns off the power thereof. The power source control unit 22 updates the "power source state" of the VM host whose power is turned off with "off" in the VM host management DB 12b.

If a VM host whose power is not turned off is present in the chassis identified at S201 (Yes at S306), the system control is returned to S301. The movement control unit 17 selects another VM host and then repeats the processing subsequent thereto. By contrast, if no VM host whose power is not turned off is present in the chassis identified at S201 (No at S306), the movement control unit 17 terminates the processing.

The movement control unit 17, for example, identifies a "host ID" associated with the "chassis ID" identified at S201 in the VM host management DB 12b. The movement control unit 17 determines whether there is a record whose "host ID" is associated with the "chassis ID" identified at S201 and whose "power source state" is "on" in the VM host management DB 12b. If it is determined that such a record is present, the movement control unit 17 identifies the VM host corresponding to the "host ID" thus present as a VM host whose power is not turned off.

If it is determined that the retry count value is larger than the set number of times at S303 (No at S303), the movement control unit 17 terminates the processing. If it is determined that a VM guest yet to be moved is present at S304 (No at S304), the movement control unit 17 increments the retry count value (S307) and retries the processing at and after S303.

Chassis Power Source Control Processing

Figure 12:
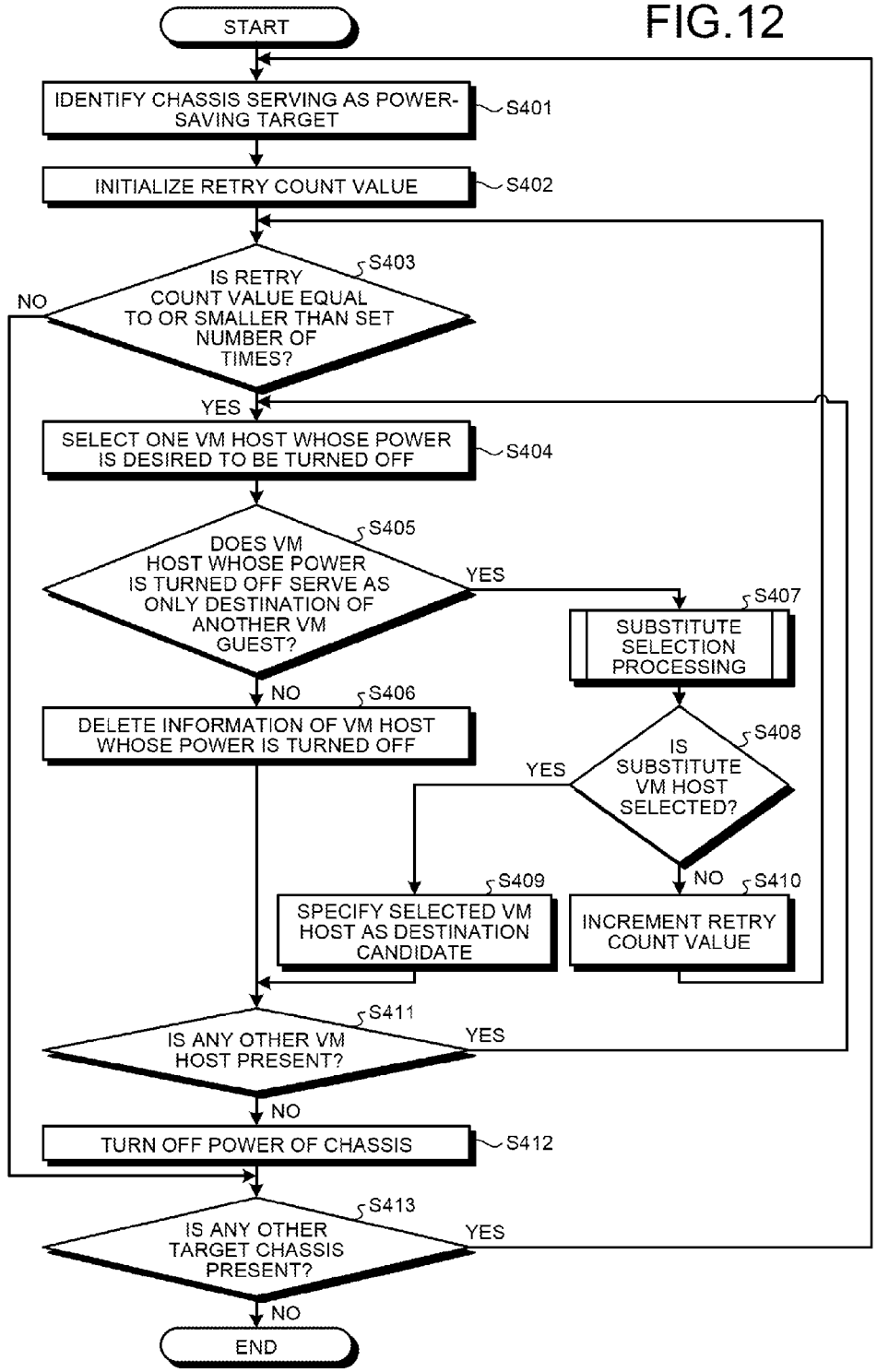
FIG. 12 is a flowchart for explaining a flow of chassis power source control processing.

The following describes the chassis power source control processing performed at S107 in FIG. 9 with reference to FIG. 12. FIG. 12 is a flowchart for explaining a flow of the chassis power source control processing. As illustrated in FIG. 12, the identifying unit 18 of the management server 10 identifies a "chassis ID" whose "power-saving setting" is "TRUE" in the chassis management DB 12a, thereby selecting a chassis serving as a power-saving target (S401).

The identifying unit 18 initializes the retry count value obtained by counting the number of times of retry (S402). The identifying unit 18 extracts a "retry counter" associated with the "chassis ID" identified at S401 from the chassis management DB 12a. The identifying unit 18 then determines whether the current retry count value is equal to or smaller than a set number of times set in the retry counter (S403).

If the retry count value is equal to or smaller than the set number of times (Yes at S403), the identifying unit 18 selects one "host ID" associated with the "chassis ID" identified at S401 and whose "power source state is off" from the VM host management DB 12b (S404).

The determining unit 19 determines whether the "host ID" identified by the identifying unit 18 serves as the only destination candidate of another VM guest (S405). The determining unit 19, for example, defines the "host ID" identified at S404 as a "target ID". The determining unit 19 then extracts a "guest ID" stored in the link management DB 12d in a manner associated with the "target ID". If there is no other "target ID" associated with the "guest ID" thus extracted than the "host ID" identified at S404, the determining unit 19 determines that the "host ID" serves as the only destination of another VM guest.

If it is determined that the "host ID" identified by the identifying unit 18 does not serve as the only destination candidate of another VM guest (No at S405), the determining unit 19 deletes the information of the VM host whose power is turned off from the DB (S406). In other words, the determining unit 19 deletes a record including the "host ID" from the link management DB 12d.

Figure 13:
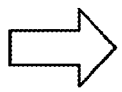
FIG. 13 is an example diagram of transition of the link management DB in the case where a plurality of destination candidates are present.

The following describes a specific determination example. FIG. 13 is an example diagram of transition of the link DB in the case where a plurality of destination candidates are present. In this example, the VM host whose power is turned off has the host ID "vm_hostC". The determining unit 19 refers to the left figure of FIG. 13. In this case, the determining unit 19 determines that a destination candidate of the guest ID "vm_guestA" specifying the "vm_hostC" as the "target ID" is registered other than the "vm_hostC", thereby determining "Yes" at S405. The determining unit 19 then deletes the record including the "vm_hostC" and the "vm_guestA" from the link management DB 12d, thereby generating the DB illustrated in the right figure of FIG. 13.

By contrast, if the determining unit 19 determines that the "host ID" identified by the identifying unit 18 serves as the only destination candidate of another VM guest (Yes at S405), the selecting unit 20 performs substitute selection processing for specifying another VM host as a destination candidate (S407).

If the selecting unit 20 selects a substitute VM host in the substitute selection processing (Yes at S408), the storage control unit 21 performs the processing at S409, thereby adding the new destination candidate. In other words, the storage control unit 21 generates a record in which the "host ID" of the VM host selected at S408 and the "guest ID" identified at S405 are associated with each other in the link management DB 12d. At this time, the storage control unit 21 may delete the record corresponding to the "host ID" identified by the identifying unit 18 from the link management DB 12d. Instead of generating a new record, the storage control unit 21 may update the "target ID" associated with the "guest ID" with the "host ID" thus selected.

Figure 14:
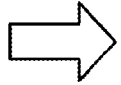
FIG. 14 is an example diagram of transition of the link management DB in the case where a new destination candidate is stored.

The following describes a specific example. FIG. 14 is an example diagram of transition of the link DB in the case where a new destination candidate is stored. In this example, there is no other destination candidate of the "vm_guestA" than the "vm_hostB", and "vm_hostE" is selected as a new destination candidate. The storage control unit 21 receives the fact that the "vm_hostE" is selected as the destination candidate of the "vm_guestA" by the substitute selection processing. The storage control unit 21 updates the "vm_hostB" associated with the "vm_guestA" on the link management DB 12d as illustrated in the left figure of FIG. 14 with the "vm_hostE" newly selected as illustrated in the right figure of FIG. 14. The storage control unit 21 may delete the record of the "vm_hostB" and newly generate a record of the "vm_hostE".

By contrast, if no substitute VM host is selected in the substitute selection processing (No at S408), the identifying unit 18 increments the retry count value (S410) and retries the processing at and after S403. At this time, the management server 10 may retry the processing described above on the VM host serving as the target or on another VM host.

After the processing from S401 to S410 is performed, the determining unit 19 determines whether any other VM host mounted on the chassis serving as the power-saving target is present using a method similar to that of S404 (S411).

If the determining unit 19 determines that no other VM host is present (No at S411), the power source control unit 22 transmits an instruction to turn off the power to the chassis serving as the power-saving target identified at S401 (S412). After the power of the chassis is turned off, the power source control unit 22 updates the "power source state" associated with the "chassis ID" of the chassis from "on" to "off" in the chassis management DB 12a.

If the determining unit 19 determines that any other chassis serving as a power-saving target is present using a method similar to that of S401 (Yes at S413), the system control is returned to S401. The management server 10 selects a chassis serving as a target and then repeats the processing subsequent thereto. If the determining unit 19 determines that no other chassis serving as a power-saving target is present (No at S413), the determining unit 19 terminates the processing.

If the determining unit 19 determines that any other VM host mounted on the chassis serving as the target is present at S411 (Yes at S411), the system control is returned to S404. The management server 10 selects another VM host thus present and then repeats the processing subsequent thereto. If the identifying unit 18 determines that the retry count value is larger than the set number of times at S403 (No at S403), the management server 10 performs the processing at S413.

Substitute Selection Processing

Figure 15:
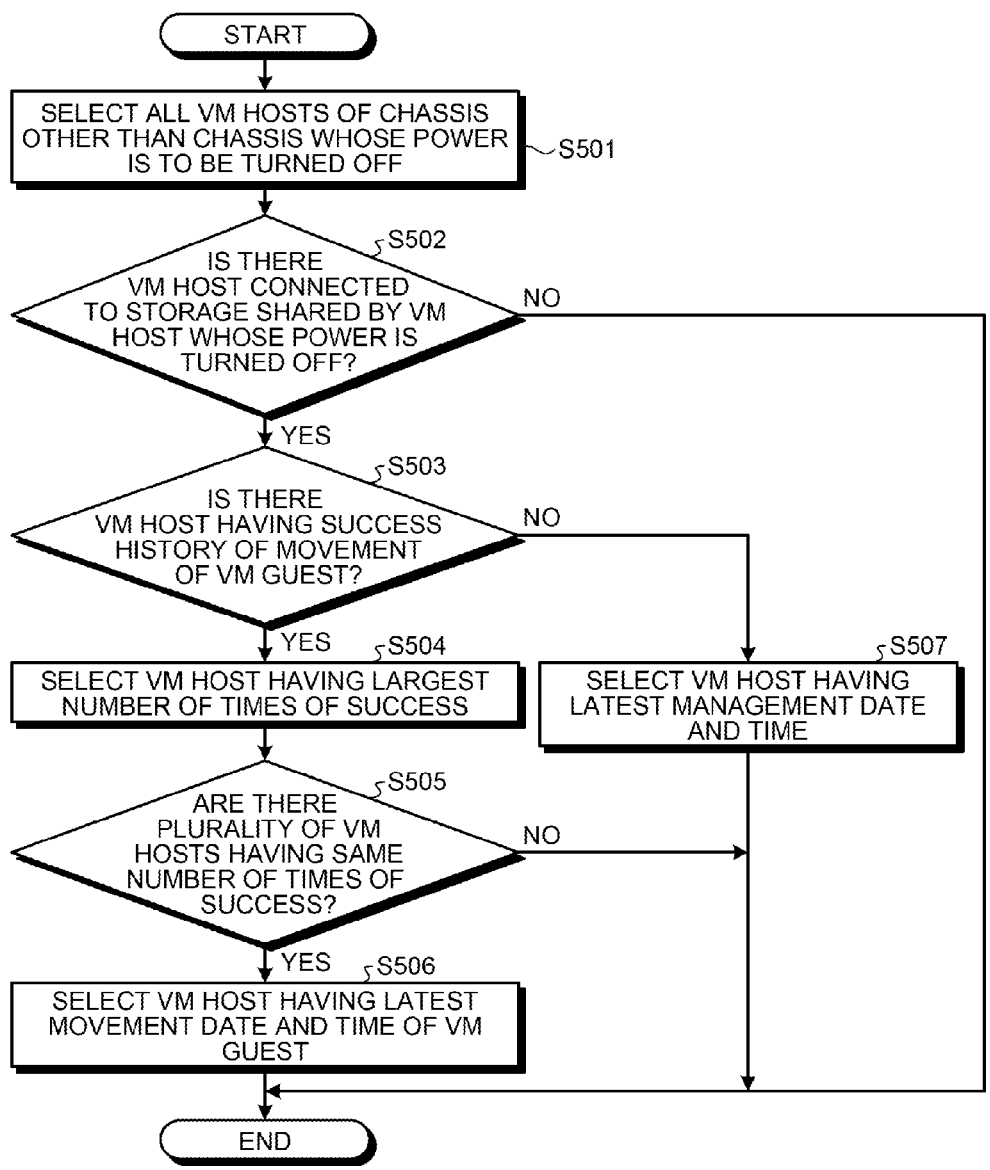
FIG. 15 is a flowchart for explaining a flow of substitute selection processing.

The following describes the substitute selection processing performed at S407 in FIG. 12 with reference to FIG. 15. FIG. 15 is a flowchart for explaining a flow of the substitute selection processing.

As illustrated in FIG. 15, the selecting unit 20 of the management server 10 selects all the VM hosts mounted on chassis other than the chassis whose power is to be turned off on which the power-saving measure is carried out (S501). Specifically, the selecting unit 20 refers to the VM host management DB 12b, thereby selecting all the "host IDs" associated with "chassis IDs" other than the "chassis ID" identified at S401 in FIG. 12.

The selecting unit 20 determines whether there is a VM host connected to a storage shared by the VM host whose power is turned off among the VM hosts thus selected (S502). Specifically, the selecting unit 20 extracts a VM host associated with the same "storage ID" as the "storage ID" associated with the VM host whose power is turned off. More specifically, the selecting unit 20 refers to the VM host management DB 12b, thereby extracting "storage IDs" associated with the respective "host IDs" selected at S501. The selecting unit 20 then refers to the VM host management DB 12b, thereby identifying a record in which the "storage ID" is identical to the "storage ID" associated with the "host ID" selected at S404 in FIG. 12 among the "storage IDs" thus extracted. The selecting unit then extracts a "host ID" associated with the record thus identified.

If it is determined that a VM host connected to the common storage is present (Yes at S502), the selecting unit 20 determines whether there is a VM host having a success history of movement of a VM guest among the VM hosts thus selected (S503). Specifically, the selecting unit 20 refers to the result management DB 12e, thereby extracting all the records in which the same ID as each "host ID" extracted at S502 is stored in the "target ID". The selecting unit 20 determines whether a record whose "status" is "TRUE" is present among the records thus extracted. The selecting unit 20 then extracts the "host ID" associated with the record whose "status" is "TRUE" as a VM host having a success history of movement of a VM guest. The selecting unit 20 may determine whether there is a success history of movement of a VM guest that operates on the VM host whose power is turned off.

If it is determined that a VM host having a success history is present (Yes at S503), the selecting unit 20 selects a VM host having the largest number of times of success among the VM hosts having a success history (S504). Specifically, the selecting unit 20 refers to the result management DB 12e, thereby counting the number of records whose "status" is "TRUE" for the "host IDs" corresponding to the records extracted at S503. The selecting unit 20 then extracts the "host ID" having the largest number of "TRUE" thus counted as a VM host having the largest number of times of success.

The selecting unit 20 determines whether there are a plurality of VM hosts extracted at S504 (S505). In other words, the selecting unit 20 determines whether there are a plurality of "host IDs" having the largest number of times of success.

If it is determined that there are a plurality of VM hosts having the largest number of times of success (Yes at S505), the selecting unit 20 selects a VM host having the latest movement date and time of a VM gust as a VM host serving as a destination candidate (S506). Specifically, the selecting unit 20 refers to the result management DB 12e, thereby extracting the "movement date and time" of the records whose "status" is "TRUE" for the respective "host IDs" having the largest number of times of success. The selecting unit 20 then selects a "host ID" whose "movement date and time" thus extracted is the latest as a new destination candidate. Subsequently, the system control is returned to the processing illustrated in FIG. 12.

By contrast, if it is determined that there are not a plurality of VM hosts having the largest number of times of success (No at S505), that is, if there is one VM host having the largest number of times of success, the selecting unit 20 selects the VM host as a new destination candidate. Subsequently, the system control is returned to the processing illustrated in FIG. 12.

If it is determined that no VM host having a success history is present at S503 (No at S503), the selecting unit 20 selects a VM host having the latest management date and time as a new destination candidate (S507). Specifically, the selecting unit 20 refers to the VM host management DB 12b, thereby identifying a VM host whose "registration date and time" is the latest among the VM hosts extracted at S502. The selecting unit 20 then selects the VM host thus identified as a new destination candidate. Subsequently, the system control is returned to the processing illustrated in FIG. 12.

If it is determined that no VM host connected to the common storage is present at S502 (No at S502), the selecting unit 20 determines that there is no VM host serving as a substitute. Subsequently, the system control is returned to the processing illustrated in FIG. 12. As a result, the management server 10 determines "No" at S408 in FIG. 12.

As described above, the management server 10 according to the first embodiment can move the VM guests on all the VM hosts in the chassis serving as the power-saving target to another VM host in another chassis in an environment provided with a plurality of chassis, such as a data center. The management server 10 can automatically turn off the power of the chassis after the power of all the source VM hosts is turned off. In the case where the VM host whose power is turned off serves as the only destination candidate of another VM guest, the management server 10 can add a new destination candidate of the VM guest. This can prevent a situation where the power of the chassis fails to be turned off.

In the selection of a new destination candidate, the management server 10 can select the destination candidate based on result information, such as the connection status of the storage, the success history, and the result history. After the management server 10 actually moves a VM guest for which a destination candidate is newly selected to the destination candidate thus selected, it is possible to prevent a failure in which the VM guest fails to operate in the destination, for example. In other words, this increases the possibility that the VM guest thus moved operates properly in the operation after the chassis power is turned off.

Because the power consumption of one chassis can be reduced in the data center, the total operational cost of the data center can be reduced. In addition, the operation performed manually by the administrator is performed automatically. This can reduce the time used to turn off the chassis power compared with the conventional technology.

[b] Second Embodiment

The first embodiment describes the processing for determining, to turn off the power of a chassis, a substitute of a destination in the case where a VM host whose power is turned off serves as the only destination of a VM guest that operates in another chassis. The embodiment is not limited thereto. To turn off the power of a VM host, the embodiment can determine a substitute of a destination if the VM host serves as the only destination of a VM guest that operates in another VM host, for example.

Figure 16:
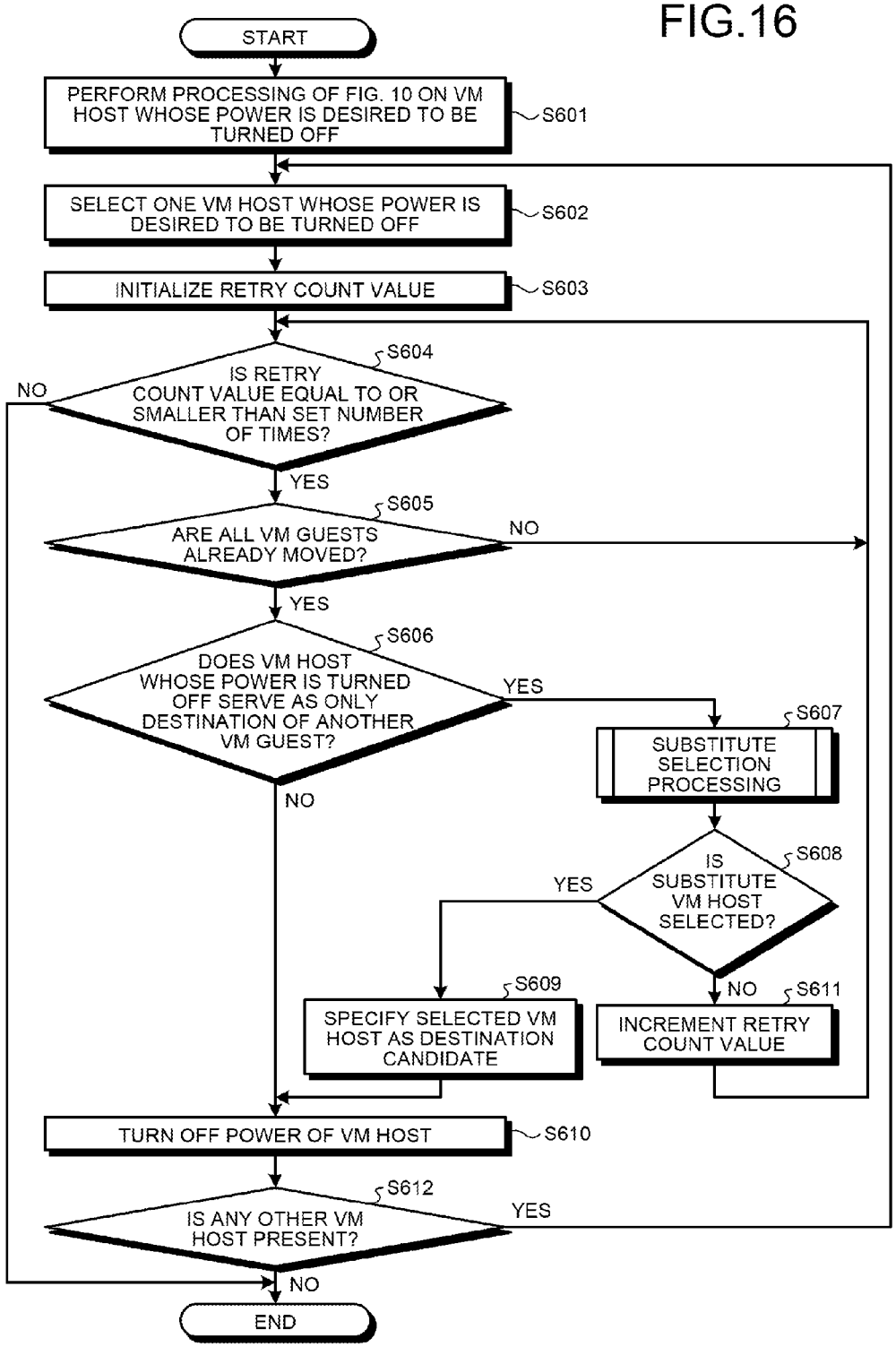
FIG. 16 is a flowchart of a flow of processing for determining a substitute of a destination to turn off the power of a VM host.

A second embodiment describes an example of processing for determining a substitute of a destination to turn off the power of a VM host. FIG. 16 is a flowchart of a flow of the processing for determining a substitute of a destination to turn off the power of a VM host.

As illustrated in FIG. 16, the management server 10 performs processing similar to that of FIG. 10 on each VM host whose power is instructed to be turned off by the user, thereby moving VM guests that operate on the VM host serving as the target to another VM host (S601).

The movement control unit 17 of the management server 10 selects one VM host on which the processing similar to that of FIG. 10 is performed (S602). The movement control unit 17 initializes the retry count value obtained by counting the number of times of retry (S603). The movement control unit 17 extracts a "retry counter" associated with the "host ID" selected at S602 from the VM host management DB 12b. The movement control unit 17 then determines whether the current retry count value is equal to or smaller than a set number of times set in the retry counter (S604).

If the retry count value is equal to or smaller than the set number of times (Yes at S604), the movement control unit 17 determines whether all the VM guests that operate on the VM host selected at S602 are moved to another VM host (S605).

If the movement control unit 17 determines that all the VM guests are already moved (Yes at S605), the determining unit 19 determines whether the VM host whose power is desired to be turned off serves as the only destination candidate of another VM guest (S606). Specifically, the determining unit 19 extracts records in which the "host ID" of the VM host whose power is desired to be turned off is registered as the "target ID" from the link management DB 12d. The determining unit 19 determines whether there is a "guest ID" having no other "target ID" than the "host ID" whose power is desired to be turned off among the records thus extracted. If there is a "guest ID" having only the "host ID" whose power is desired to be turned off as the "target ID", the determining unit 19 determines that the VM host whose power is desired to be turned off serves as the only destination candidate of another VM guest.

If it is determined that the VM host whose power is desired to be turned off serves as the only destination candidate of another VM guest (Yes at S606), the selecting unit 20 performs substitute selection processing (S607). Specifically, the selecting unit 20 performs processing similar to that of FIG. 15 on the VM host whose power is desired to be turned off.

If a substitute VM host is selected in the substitute selection processing (Yes at S608), the storage control unit 21 adds the new destination candidate obtained by performing the processing at S609. In other words, the storage control unit 21 stores the "host ID" of the VM host selected in the substitute selection processing as the "target ID" associated with the "guest ID" identified at S606 in the link management DB 12d.

The power source control unit 22 transmits an instruction to turn off the power to the VM host whose power is to be turned off (S610). The VM host whose power is to be turned off receives the instruction and turns off the power thereof. If it is determined that the VM host whose power is desired to be turned off does not serve as the only destination candidate of another VM guest at S606 (No at S606), the power source control unit 22 also transmits an instruction to turn off the power to the VM host whose power is to be turned off (S610).

By contrast, if no substitute VM host is selected in the substitute selection processing (No at S608), the management server 10 increments the retry count value (S611) and retries the processing at and after S604. Similarly, if it is determined that all the VM guests are yet to be moved at S605 (No at S605), the system control is returned to S604. The movement control unit 17 performs the processing at and after S604.

If any other VM host whose power is to be turned off is present after the processing from S601 to S611 is performed (Yes at S612), the system control is returned to S602. The management server 10 selects another VM host and then performs the processing subsequent thereto.

By contrast, If no other VM host whose power is to be turned off is present after the processing from S601 to S611 is performed (No at S612), the management server 10 terminates the processing. Similarly, if the retry count value is larger than the set number of times set in the retry counter at S604 (No at S604), the movement control unit 17 terminates the processing.

As described above, to turn off the power of a VM host, the management server 10 can determine whether the VM host serves as the only destination candidate of another VM guest. If the VM host serves as the only destination candidate, the management server 10 can select a new destination candidate. Similarly to the first embodiment, the management server 10 selects the destination candidate based on the results and the like. This can reduce the possibility of a failure in which the VM guest fails to operate in the destination, for example. As described above, the management server 10 can perform similar processing on either of a chassis and a VM host. The management server 10 can perform the processing described above in power source management units.

[c] Third Embodiment

While the embodiments according to the present invention have been described, the present invention may be provided in various different aspects besides the embodiments described above. The following describes other embodiments.

Substitute Determination Conditions

While the first embodiment determines whether a VM host has a connection to a common storage, a success history, the largest number of times of success, the latest movement date and time, and the latest management date and time, the determination order is not limited to that in the first embodiment. Determination may be made by using any one of the conditions or combining arbitrary conditions in an arbitrary order.

Substitute Selection Processing

While the first embodiment performs the substitute selection processing of a VM host to turn off the power of a chassis, and the second embodiment performs the substitute selection processing to turn off the power of a VM host, both the processing may be combined. Before the power of the VM host is turned off at S305 in FIG. 11, the processing illustrated in FIG. 16 may be performed, for example.

Processing Order

While the first embodiment performs the movement processing of a VM guest, turning off of the power of a VM host, and the power source processing of a chassis sequentially after changing the setting of the power-saving function, the processing order is not limited thereto. These processing may be performed at different timings, for example. Alternatively, the movement processing of a VM guest, turning off of the power of a VM host, and the substitute selection may be performed only on a chassis for which the setting is changed.

System

Among the processing described in the embodiments, the whole or a part of the processing automatically performed in the description may be performed manually. Alternatively, the whole or a part of the processing manually performed in the description may be performed automatically by a publicly known method. The processing order, the control order, the specific names, and the information including various types of data and parameters described in the present specification and the figures may be arbitrarily changed unless otherwise specified.

The components of each device illustrated in the drawings are functionally conceptual components and are not always physically configured as illustrated. In other words, the specific aspects of distribution and integration of each device are not limited to those illustrated in the drawings. The whole or a part thereof may be distributed or integrated functionally or physically in arbitrary units depending on various types of loads and usage, for example. The whole or an arbitrary part of processing functions performed in each device may be carried out by a CPU or a computer program analyzed and executed by the CPU or as wired-logic hardware.

Hardware Configuration

The various types of processing described in the embodiments can be performed by a computer system, such as a personal computer and a workstation, executing a computer program prepared in advance. The following describes an example of a computer system that executes a computer program having functions similar to those of the embodiments.

Figure 17:
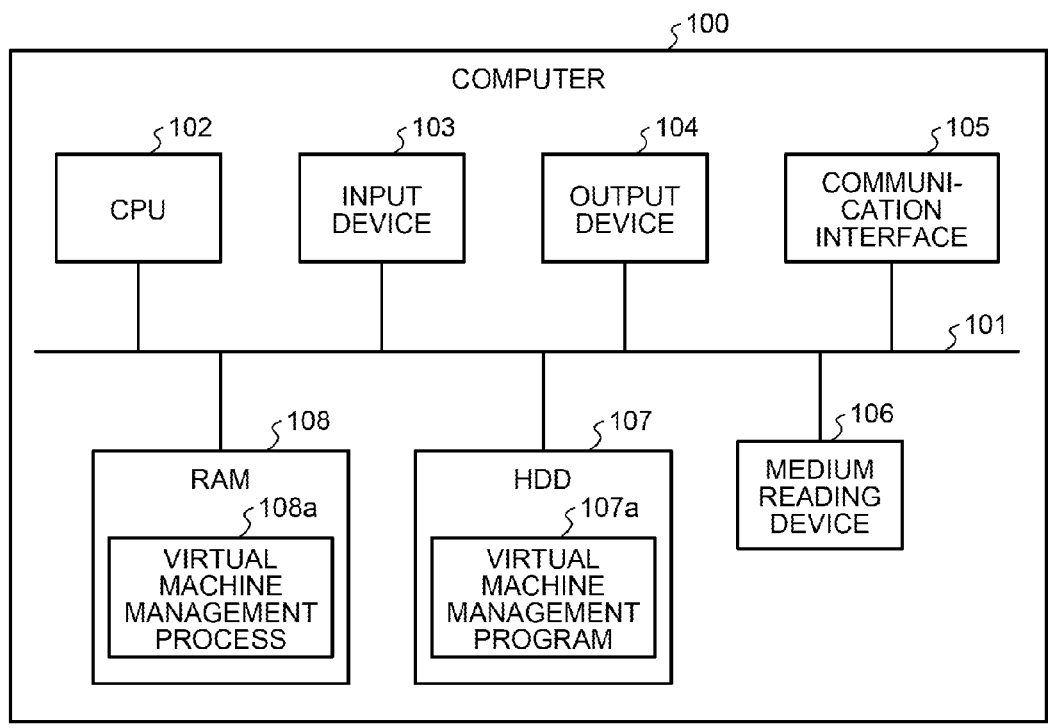
FIG. 17 is an example diagram of a hardware configuration of a computer that executes a virtual machine management program.

FIG. 17 is an example diagram of a hardware configuration of a computer that executes a virtual machine management program. As illustrated in FIG. 17, a computer 100 includes a CPU 102, an input device 103, an output device 104, a communication interface 105, a medium reading device 106, a hard disk drive (HDD) 107, and a random access memory (RAM) 108. The units illustrated in FIG. 17 are connected to one another via a bus 101.

The input device 103 is a mouse and a keyboard, the output device 104 is a display and the like, and the communication interface 105 is an interface, such as a network interface card (NIC). The HDD 107 stores therein the DBs illustrated in FIG. 2 besides a virtual machine management program 107a, for example. The HDD 107 is given as an example of a recording medium. Alternatively, various types of computer programs may be stored in another computer-readable recording medium, such as a read-only memory (ROM), a RAM, and a compact disk read-only memory (CD-ROM), and read by the computer. The recording medium may be arranged at a remote place. In this case, the computer accesses the recording medium, thereby acquiring and using the computer programs. At this time, the computer may store and use the computer programs thus acquired in a local recording medium.

The CPU 102 reads and loads the virtual machine management program 107a on the RAM 108, thereby operating a virtual machine management process 108a that carries out the functions illustrated in FIG. 2, for example. In other words, the virtual machine management process 108a carries out functions similar to those of the setting change unit 16, the movement control unit 17, the identifying unit 18, the determining unit 19, the selecting unit 20, the storage control unit 21, and the power source control unit 22 illustrated in FIG. 2. The computer 100 operates as an information processor that performs a virtual machine management method by reading and executing the computer program.

The computer 100 may cause the medium reading device 106 to read the virtual machine management program from the recording medium. By executing the virtual machine management program thus read, the computer 100 can carry out functions similar to those of the embodiments. The computer program according to other embodiments is not always executed by the computer 100. The present invention is also applicable to the case where another computer or another server executes the computer program or where the computer and the server cooperate to execute the computer program, for example.

According to the embodiments can reduce power consumption.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A power source management device comprising:
   a plurality of physical machines;
   a first control unit that performs power supply control on a first physical machine group including at least one physical machine among the physical machines;
   a second control unit that performs power control on a second physical machine group including at least one physical machine among the physical machines and performs power control on a physical machine different from a physical machine on which the first control unit performs power supply control;
   a storage unit that stores therein destination physical machine information capable of identifying a physical machine serving as a destination candidate of a certain virtual machine that operates on any one of the physical machines; and
   a control unit that changes, to stop power supply to the first physical machine group performed by the first control unit, the destination physical machine information such that the destination candidate of the certain virtual machine includes at least a physical machine belonging to the second physical machine group when information capable of identifying the physical machine serving as the destination candidate and stored in the storage unit includes no other physical machine than a physical machine belonging to the first physical machine group.

2. The power source management device according to claim 1, wherein the control unit changes the destination physical machine information such that the destination candidate of the certain virtual machine includes a physical machine to which a virtual machine is successfully moved previously out of the physical machine belonging to the second physical machine group.

3. The power source management device according to claim 1, wherein the control unit changes the destination physical machine information such that the destination candidate of the certain virtual machine includes a physical machine having a largest number of times of movement of a virtual machine out of the physical machine belonging to the second physical machine group.

4. The power source management device according to claim 1, wherein the control unit changes the destination physical machine information such that the destination candidate of the certain virtual machine includes a physical machine having a latest date and time of movement of a virtual machine out of the physical machine belonging to the second physical machine group.

5. The power source management device according to claim 1, wherein the control unit changes the destination physical machine information such that the destination candidate of the certain virtual machine includes a physical machine having a latest date and time of registration to the power source management device out of the physical machine belonging to the second physical machine group.

6. A power source management method comprising:
   detecting, to stop power supply to a first physical machine group performed by a first control unit that performs power supply control on the first physical machine group including at least one physical machine among a plurality of physical machines, a fact that information capable of identifying a physical machine serving as a destination candidate and stored in a storage unit that stores therein destination physical machine information capable of identifying a physical machine serving as a destination candidate of a certain virtual machine that operates on any one of the physical machines includes no other physical machine than a physical machine belonging to the first physical machine group; and
   changing the destination physical machine information such that the destination candidate of the certain virtual machine includes at least a physical machine belonging to a second physical machine group that includes at least one physical machine different from a physical machine on which the first control unit performs power supply control.

7. A computer-readable recording medium having stored therein a power source management program causing a computer to execute a process comprising:
   detecting, to stop power supply to a first physical machine group of a first control unit that performs power supply control on the first physical machine group including at least one physical machine among a plurality of physical machines, a fact that information capable of identifying a physical machine serving as a destination candidate and stored in a storage unit that stores therein destination physical machine information capable of identifying a physical machine serving as a destination candidate of a certain virtual machine that operates on any one of the physical machines includes no other physical machine than a physical machine belonging to the first physical machine group; and
   changing the destination physical machine information such that the destination candidate of the certain virtual machine includes at least a physical machine belonging to a second physical machine group that includes at least one physical machine different from a physical machine on which the first control unit performs power supply control.

* * * * *